Aug. 23, 1932.    E. L. O. ALLEN    1,873,100
SHOCK ABSORBER
Filed July 28, 1930
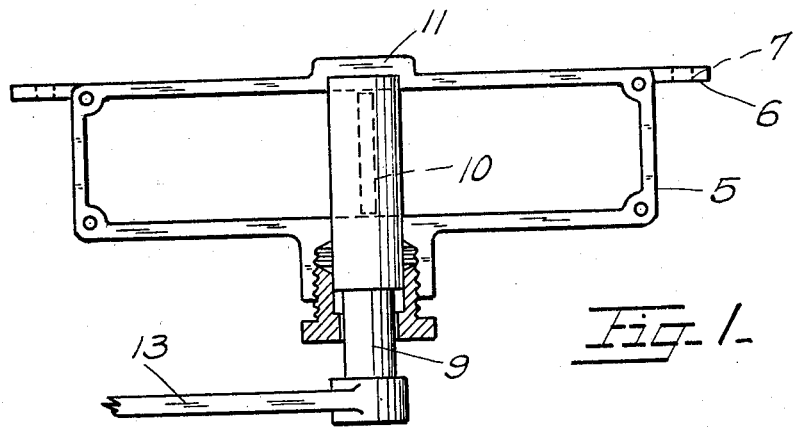
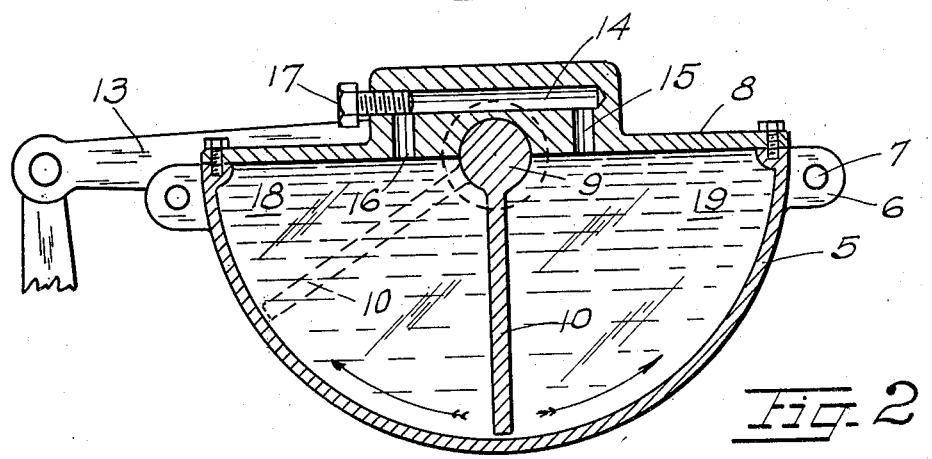
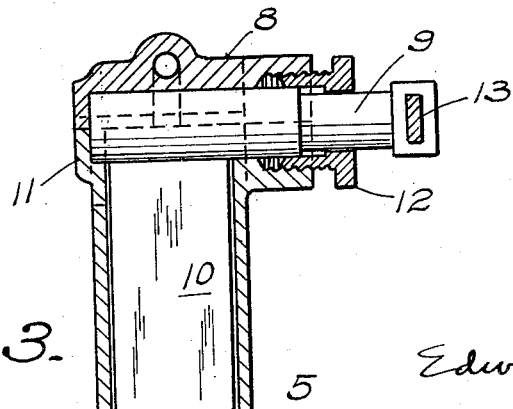
INVENTOR.
Edward L. O. Allen
BY
Harry C. Schroeder
ATTORNEY Patented Aug. 23, 1932

1,873,100

UNITED STATES PATENT OFFICE

EDWARD L. O. ALLEN, OF OAKLAND, CALIFORNIA

SHOCK ABSORBER

Application filed July 28, 1930. Serial No. 471,166.

The invention is for a shock absorber and has special reference to a device for minimizing the road shocks normally transmitted through the springs to the frame of an automotive vehicle, thereby providing for the comfort of the occupants of the vehicle, preventing the breaking of springs, and practically eliminating rebound.

The main object of the invention is to provide a shock absorber of the hydraulic type which is extremely simple in construction, application, and operation, very efficient in its function, and neat in appearance and compact, requiring very little space for installation, and applicable to any make of automotive vehicle.

The invention consists primarily of a semi-cylindrical, trough like housing, provided with a substantially flat cover, the cover being provided with a fluid by-pass from one end to the other. A shaft is centrally located and rotatable in bearings, and has affixed thereto a vane, freely fitting in the housing, whereby the fluid is forced from one side to the other about the vane and through the by-pass. Adjustment is provided for the by-pass which may be restricted as required for best results. A lever is fixed to the end of the shaft, and connects with the axle of the vehicle by means of a rigid connecting link.

The invention is adequately illustrated in the accompanying drawing in which:

Fig. 1 is a top plan view of the invention with the cover removed and the packing gland in section.

Fig. 2 is a longitudinal sectional elevation taken through the device, with cover in place.

Fig. 3 is a transverse sectional elevation with cover in place.

Similar reference characters are used to designate similar parts throughout the several views.

The invention consists of a semi-cylindrical housing 5 provided with ears 6 and mounting aperture 7, whereby the device may be fixedly attached to the frame or other part of a motor vehicle. The cap 8 is closely fitted and gasketed if necessary to prevent oil leakage at the joint with housing 5. Centrally located with reference to the housing 5 is a shaft 9, having an interval vane 10, which fits freely in the housing 5, and is adapted to swing in both directions as indicated by the arrows and dotted lines of Fig. 2. A boss 11, formed in the housing 5 and cover 8, provides a seal for one end of the shaft 9, the opposite end of the shaft being provided with a packing gland 12 to prevent leakage of oil at that end. A lever 13 is fixed to the exposed end of shaft 9 and is intended to make connection with the axle of a vehicle by means of a rigid connecting link.

The cover 8 is provided with a by-pass 14 communicating with interconnecting apertures 15 and 16, the aperture 16 being restricted as required by means of the screw 17, which is threaded into the end of by-pass 14.

The operation of the device is as follows: The housing 5 is attached to the frame or body of an automotive vehicle by means of bolts through the apertures 7. A connecting link of rigid material is connected pivotally to the outer end of lever 13, the opposite end of the link being pivotally connected to the axle or other part subject directly to the road shocks. As the vehicle wheel strikes an obstruction, the load is simultaneously transmitted to the spring and to the connecting link, thence to the lever 13, moving the vane 10 toward the position shown in dotted lines and forcing the fluid from side 18 about the vane and through apertures 16, 14 and 15 to side 19 the clearing vane permitting a predetermined rate of movement while the by-pass may be adjusted to increase this rate of movement. As the wheel leaves the obstruction the opposite movement takes place, the fluid is forced from side 19 about the vane and through passages 15, 14 and 16 to side 18 checking the rebound.

It will be readily apparent that an extremely simple and effective device is thus provided which reduces or eliminates the shocks ordinarily transmitted to the body of a vehicle, and preventing the breaking of springs attributable to this cause.

It will be understood that variations in construction and arrangement of parts which are consistent with the appended claim may be resorted to without detracting from the spirit or scope of the invention, or sacrificing any of the advantages thereof.

I am aware that shock absorbers of the hydraulic type have been made for automotive vehicles, therefore I do not claim such a device broadly, but I do claim:

In a shock absorber, a semi-cylindrical housing, a cover therefor, a vane, a shaft integral with said vane, said shaft being intermediately mounted relative to the connecting plane of said housing and said cover, and an adjustably restricted by-pass in said cover, said by-pass being adjusted by means of a screw, said vane clearing the walls of said housing and forming a passage for fluid therebetween of predetermined area, whereby actuation of said absorber is permitted independently of the restricted by-pass, said by-pass being adapted to provide for decrease in resistance of said absorber.

In testimony whereof I affix my signature.

EDWARD L. O. ALLEN.